United States Patent [19]

Miller

[11] Patent Number: 4,737,278

[45] Date of Patent: * Apr. 12, 1988

[54] MINITURIZED MODULAR ROTATING BIOLOGICAL CONTACTOR SYSTEM

[76] Inventor: Gary Miller, 4931 E. 300 North, Lafayette, Ind. 47905

[*] Notice: The portion of the term of this patent subsequent to Mar. 8, 2005 has been disclaimed.

[21] Appl. No.: 58,999

[22] Filed: Jun. 8, 1987

[51] Int. Cl.⁴ ............................................. C02F 3/08
[52] U.S. Cl. .................................. 210/150; 210/232
[58] Field of Search ............... 210/619, 150, 151, 232, 210/251

[56] References Cited

U.S. PATENT DOCUMENTS

| | | | |
|---|---|---|---|
| 3,389,798 | 6/1968 | Hartmann et al. | 210/151 X |
| 3,466,241 | 9/1969 | Simpson | 210/151 X |
| 3,630,366 | 12/1971 | Joost | 210/150 |
| 3,837,492 | 9/1974 | Di Belle | 210/150 |
| 3,886,074 | 2/1975 | Prosser | 210/150 |
| 4,207,190 | 6/1980 | Sheaffer | 210/232 |
| 4,211,647 | 7/1980 | Friedman et al. | 210/150 X |
| 4,251,370 | 2/1981 | Stenglin | 210/150 |
| 4,431,537 | 2/1984 | Hirota | 210/150 |
| 4,444,658 | 2/1984 | Hankes et al. | 210/232 X |

Primary Examiner—Tom Wyse

[57] ABSTRACT

A modular rotating biological contactor apparatus is provided which utilizes a plurality of hemicylindrical trough sections, a plurality of bulkhead means interconnecting adjacent trough sections, and a pair of endplate means as subassemblies. These subassemblies are prefabricated and adapted for simple and easy interconnection with one another by means of integrally formed disengagable associatable interfitting means. Using these subassemblies, a plurality of different configurational possibilities for rotating biological contactor apparatus are achievable.

5 Claims, 1 Drawing Sheet

U.S. Patent  Apr. 12, 1988  4,737,278
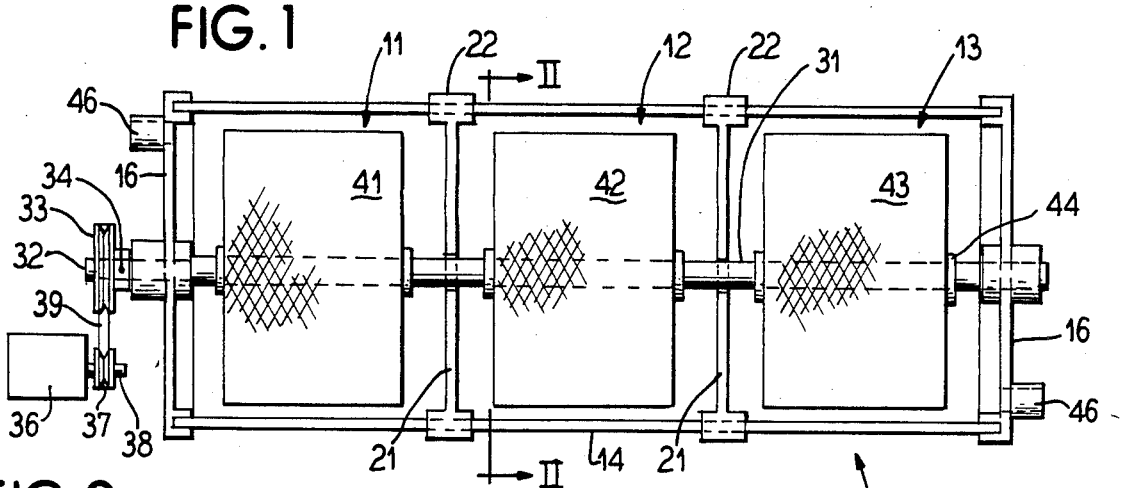
FIG. 1
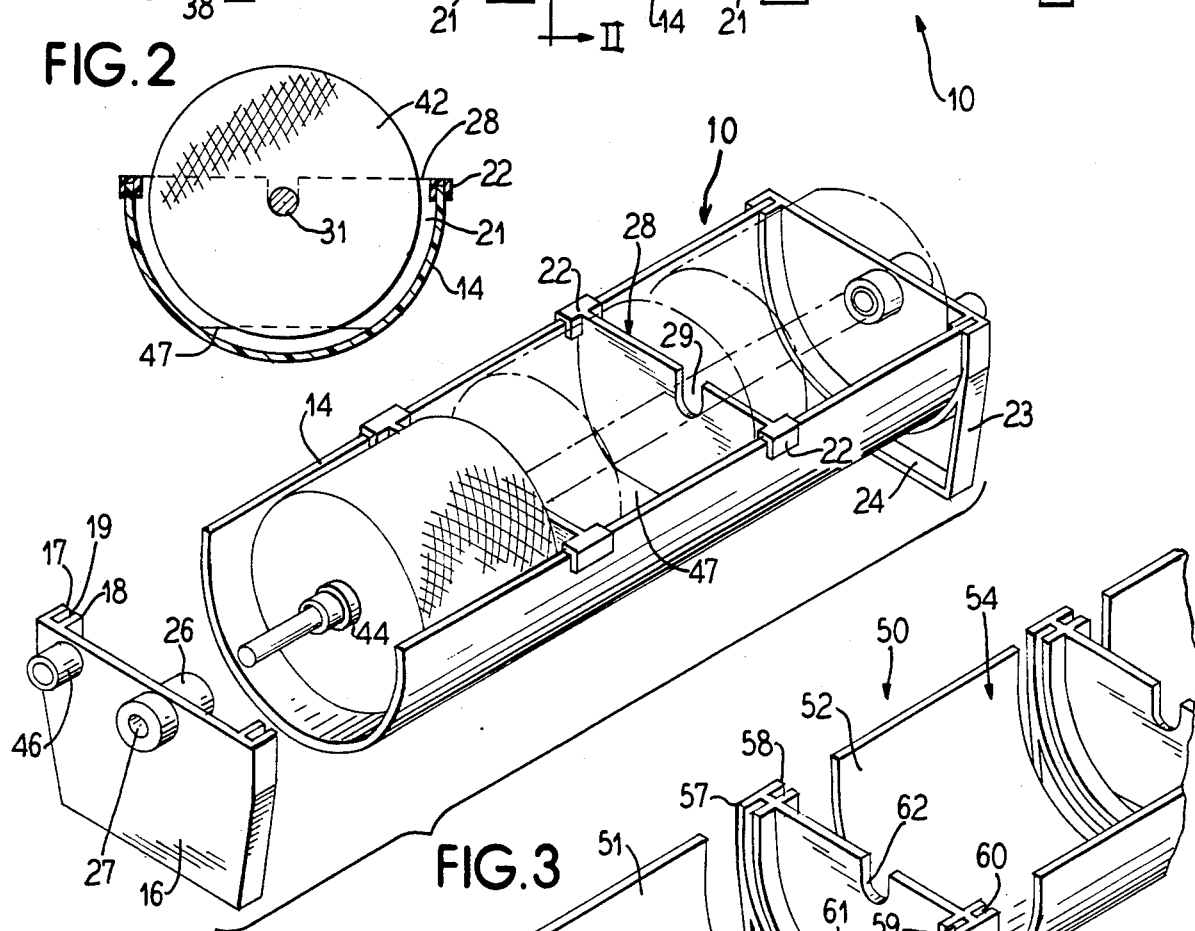
FIG. 2
FIG. 3
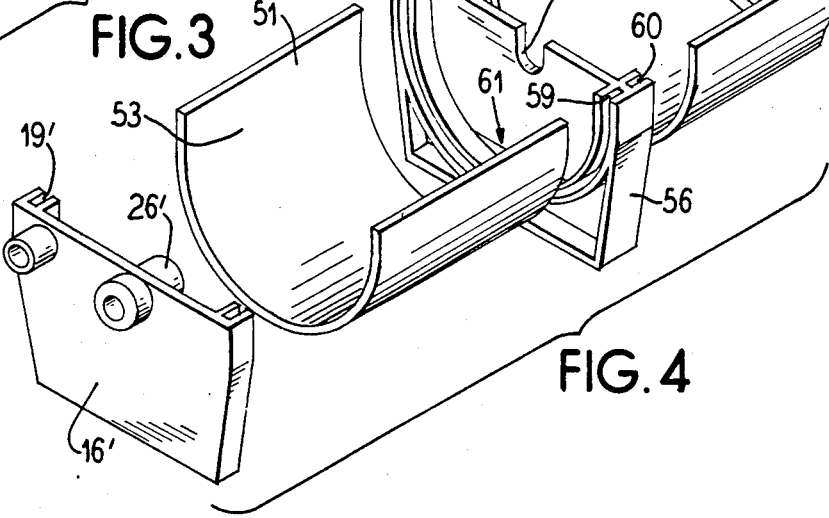
FIG. 4

MINITURIZED MODULAR ROTATING BIOLOGICAL CONTACTOR SYSTEM

BACKGROUND OF THE INVENTION

1. Field of the Invention

This invention lies in the field of rotating biological contactors particularly miniturized modular rotating biological contactor apparatus.

2. Prior Art

Rotating biological oontactors are used for the biological treatment of wastewater. Such a device characteristically utilizes a wastewater contacting medium which is fixed upon a rotatable shaft and arranged to continuously revolve in a reservoir of wastewater to be treated. In an aerobic such device, as the contacting medium rotates, the medium experiences alternatively exposure to wastewater and then to oxygen (air). A biological culture develops on the medium which has capability for digestion of substrates in the wastewater.

The rotating biological contactor has only been used in the United States since the early 1960's. The state of the art is presented in such publications as "Fixed Biological Surfaces—Wastewater Treatment" by R. L. Antonie (CRC Press, 1976), "Biological Wastewater Treatment Theory and Application" by C. P. L. Grady, Jr., and H. C. Lim (Marcel Dekker, Inc., 1980), and the "Proceedings: First National Symposium/Workshop on Rotating Biological Contactor Technology" edited by E. D. Smith, R. D. Miller, and Y. C. Wu (Army Corp. Engineers, USEPA, and University of Pittsburgh, 1980).

In the design stage of producing of a commercially-sized rotating biological contactor, there is frequently a need or a desire to evaluate and/or to optimize proposed system parimeters and the like through the utilization of a miniturized or laboratory-scale embodiment of a rotating biological contactor. Also, in the study of wastewater treatment, in a laboratory or the like, by a rotating biological contactor, there is frequently a need or desire to utilize a small or miniturized embodiment of a rotating biological contactor which can be employed to test, evaluate, and research such matters as operating perimeters, system configurations, system components, and the like. So far as is now known, very little attention in the rotating biological contactor art has previously been paid to the provision of miniturized rotating biological contactor apparatus which is particularly well suited for utilization in engineering design, research, educational study, and like situations where benchscale equipment is needed. Such miniturized equipment as has been available in the past has typically been fabricated on an individual need basis from expensive model-making materials, and the like.

There is a need in the art for inexpensive modular-type miniturized rotating biologioal contactor apparatus which can be simply and easily assembled, disassembled, reassembled, modified, expanded, reused, and/or the like, and which can provide a plurality of different potential apparatus configurations. For example, apparatus is desirable which can optionally be reused, if desired, in a different combination from that employed in a given prior test procedure. Furthermore, and also desirably, such miniturized apparatus should be capable of easy storage, reliable operation, and low cost.

BRIEF SUMMARY OF THE INVENTION

This invention relates to improved rotating biological contactor apparatus, and more particularly to miniturized modular rotating biologioal contactor apparatus utilizing novel disengagably interfitting subcomponents.

Thus, in one aspect, the present invention provides a new and very useful class of miniturized modular rotating biological contactor apparatus which is comprised of various new and very useful subcomponents. The apparatus is in the form of modular units which can be assembled together in various possible combinations such as may be desired by a user in a simple, effective and reliable manner.

In another aspect, the present invention provides a group of preformed subcomponents which disengagably interfit with one another in a desired manner and which can be assembled directly in a simple, effective and reliable manner to produce various combinations of modular units comprising as a whole rotating biological contactor apparatus without the need for auxiliary fastening means, such as nuts and bolts, rivets, adhesives, or the like.

The invention thus provides in one aspect the capability of providing an apparatus assembly adapted to meet the particular demands and needs associated with an individual laboratory or test use situation, or the like.

The invention provides in another aspect a rotating biological contactor apparatus comprised of a group of interconnecting and cooperating subassemblies which disengagably interfit and coact together.

Another object is to provide a miniturized rotating biological contactor apparatus, and subcomponents useful therein, which can be assembled and disassembled and then reassembled in a different configuration if desired in a simple and effective manner utilizing a minimum number of components.

Another object is to provide a miniaturized modular rotating biological contactor system which is easy to use, assemble, maintain and which is economical, reliable and well adapted for usage in substantially all situations where small scale modular rotating biological contactor apparatus can be employed for wastewater treatment.

Other and further objects, aims, purposes, features, advantages, aspects, embodiments, and the like will be apparent to those skilled in the art from the teachings of the present specification taken with the accompanying drawings.

BRIEF DESCRIPTION OF DRAWINGS

In the drawings:

FIG. 1 is a top plan view of one embodiment of a modular rotating biological contactor apparatus of the present invention;

FIG. 2 is a vertical sectional view taken along the line II—II of FIG. 1;

FIG. 3 is an isometric view of the apparatus of FIG. 1 with some parts thereof exploded and other parts thereof shown in phantom; and FIG. 4 is an isometric view in a partially fragmentary form of an alternative embodiment of the present invention with some parts thereof exploded.

DETAILED DESCRIPTION

In FIGS. 1–3, there is seen an embodiment 10 of a miniaturized rotating biologioal contactor apparatus of the present invention. Embodiment 10 is comprised of preformed modular subassemblies which in embodiment 10 are combined to provide three different repeating units or stages 11, 12 and 13.

The longitudinal size of an individual stage 11, 12 or 13 can vary, if desired, from one stage to another in the embodiment 10 as can the total number of stages employed in any given embodiment 10. The length of an individual stage and the number of stages per embodiment is influenced or controlled by the user so as to take into account such variables as anticipated wastewater feed composition, conditions of wastewater treatment, projected operationable variables, and the like, as those skilled in the art will appreciate.

No particular criticality is associated with the dimensions associated with an embodiment 10 or with stages such as stages 11, 12 and 13; however, the apparatus of the present invention is believed to be particularly well suited for use in miniaturized modular rotating biological contactor apparatus wherein the weight and volume considerations of the wastewater being treated do not interpose any particular excessive structural stress upon the particular stationary components utilized in a given embodiment of apparatus of the invention. The inside diameter of each of the stages is the same and illustratively can range, for example, from about 3 to 20 inches, if desired.

In embodiment 10, the side walls of the stages 11, 12 and 13 are formed of a single hemicylindrical trough section 14 which is conveniently comprised of thermoformed or extruded plastic, such as a thermoplastic material such as a polyethylene, a polypropylene, a polyamide, a polyester, a polyurethane, a polyacrylic, or the like. Thermoset plastics can also be employed, if desired, such as a glass filled of polyester resin or the like. Metals such as castable alloys can also be used. Reinforcing ribs or the like (not shown) may be integrally formed with a trough section 14. Trough section 14 can be cut to length by a user to achieve a particular desired, assembled, apparatus configuration.

Embodiment 10 also utilizes a terminal bulkhead or endplate 16 which is conveniently comprised of a molded plastic, such as a thermoplastic or thermoset plastic, such as one of the classes above-indicated. The same endplate 16 structure is employed in embodiment 10 at each opposed end of the hemicylindrical trough section 14. Each endplate 16 is provided with a hemicircular, integrally-formed pair of raised (laterally projecting) flanges 17 and 18 which define therebetween a receiving groove 19. The receiving groove 19 is configured and adapted to receive therein the end portions of one end of hemispherical trough section 14. Thus, the trough section 14 is engagable at each end with a different endplate 16 to provide a free-standing assembly without the required use of auxiliary fastening means, such as rivets, nut and bolts means, adhesives, or the like. The assembled embodiment 10 can be positioned on a tray or the like to catch any drippage during operation. However, and as those skilled in the art will appreciate, if desired, releasable adhesives and sealants can be used in the assembly of a trough section 14 with endplates 16 as when it is desired to provide a fluid tight interrelationship between these respective components.

Embodiment 10 further includes intermediate baffles or bulkheads 21. Each bulkhead 21 is generally and conveniently hemicylindrically configured so as to be nestably receivable diametrically across hemispherical trough section 14. Opposed opposite upper diametrical opposed side edges of each bulkhead 21 are here each provided with an integrally formed saddle-type clip member 22 (paired) so that when the bulkhead 21 is mounted within a trough section 14 each clip 22 is adapted to be nestably received over adjacent opposed side edge portions of the trough section 14 thereby positioning each bulkhead 21. Thus, no fastening means is required for associating a bulkhead 21 with a trough section 14 although, as those skilled in the art will appreciate, and as in the case of the endplate 16, if desired, auxiliary materials, such as sealant means or the like, can be employed to effectuate an objective such as a complete fluid-tight seal between the perimeter edges of a bulkhead 21 and adjacent portions of a trough section 14. Each bulkhead 21 can be formed of a molded plastic material similar in composition to the material used in the trough section 14 or in the endplate 16. In embodiment 10, a pair of bulkheads 21 is employed which are positioned so as to complete the definition of the side walls (together with trough section 14 and endplates 16) of each of the respective stages 11, 12 and 13.

Each of the endplates 16 includes a downwardly projecting portion which serves as a support for ground engagement thereof whereby the trough section 14 when engaged with endplate 16 is maintained in a predetermined elevated relationship to the supporting underlying surface. For structural integrity reasons, each endplate 16 is preferably provided with a flanged perimeter along its sides 23 and bottom edges 24 which is also integrally interengaged with the flanges 17 and 18 as shown in the embodiment of endplate 16, thereby to provide added rigidity and stability for the endplate 16.

Because of the equalization of fluid pressures on each side of a bulkhead 21 in embodiment 10, the stresses and laterally exerted forces upon a bulkhead 21 are relatively small so that there is little a tendency for a bulkhead 21 to be laterally displaced in an assembled embodiment 10.

In the upper central regions of endplate 16, a cylindrically-shaped, integrally-formed bearing member 26 is formed which is provided axially with a channel 27 defined therein. Also, centrally formed in the top edge 28 of each bulkhead 21 is an open slot 29. In the embodiment 10, the channel 27 in each endplate 16 (paired) is aligned with each slot 29. Thus, an elongated shaft member 31 can be extended through the channels 27 and the slots 29 with a projecting end portion 32 being provided at one end of shaft 31 for association with a drive means, here illustratively shown as a pulley 33, which is fixed on shaft end 32 by means of a set screw 34 or the like. Because of the slow rotational speeds characteristically associated with a driven shaft 31 the interior surfaces of channel 27 are adequate to comprise bearing surfaces for adjacent portions of the shaft 31, as those skilled in the art will appreciate. A drive motor 36 (conventional) is conveniently located adjacent the shaft end 32 and is provided with a drive pulley 37 fixed upon the motor stub shaft 38, the pulley 37 being in aligned relationship relative to the pulley 33. A drive belt 39 conventionally interengages the pulleys 37 and 33 to permit the shaft 31 to be rotatable driven. Any convenient drive system can be employed.

Before the shaft 31 is assembled with the other components of embodiment 10, individual contactor assemblies are mounted thereupon so as to provide a contactor for each of the respective stages 11, 12 and 13 in the embodiment 10, the individual contactor in the embodiment 10 being identified as 41, 42 and 43, respectively.

Each of the contactors 41, 42 and 43 can be of conventional structure and can be of a type which is known to those skilled in the art of rotating biological contactors. In general, such a contactor has a high surface area. The circumferential side walls or edge portions of each of the contactors 41, 42 and 43 is such as to permit an individual contactor 41, 42 and 43 to be in adjacent but spaced relationship relative to the inside adjacent wall portions of the hemicylindrical trough section 14 in the assembled embodiment 10.

Any convenient means can be used to position and locate a contactor 41, 42 and 43 upon the shaft 31. For example, in the embodiment 10, collars 44 are slidably received upon the shaft 31 at each end of the individual contactors 41 with the individual collar 44 being fixed upon the shaft 31 by means of a set screw or the like (not shown).

Many different contactor structures and arrangements are known to the prior art, and, so far as is now known, any convenient or desired such contactor can be used in apparatus of the present invention. Thus, for example, the spiral wrap contactor assembly of U.S. Pat. No. 4,532,035, the disk contactor assembly of U.S. Pat. No. RE29,970, corrugated-type contactor constructions, shell type contactor structures, such as are available commercially under the trademark "Bio-Sphere", plate and disk segment types of contactor assemblies such as disclosed in U.S. Pat. No. 4,608,162, and the like, can be employed. A present preference is to employ a contactor having a relatively high surface to volume ratio. Conventional contactors have surface areas of approximately at least about 35 square feet per cubic foot. Different contactors can be employed in different stages of an embodiment 10, depending upon the wishes of the user.

In order to provide a fluid input and/or output passageway at each end of embodiment 10, the endplate 16 is provided with an integrally formed projecting tubular structure 46 which is adapted to be associated with a rubber hose, or the like (not shown), through which a wastewater fluid, simulated wastewater fluid, or the like can be input or removed (as the case may be) in an assembled embodiment 10.

Similarly, in order to provide a fluid passageway from one stage to another, a bottom segment 47 is removed from each of the bulkheads 21 during the formation thereof thereby, to provide a channel or passageway as desired between adjacent stages such as between stages 11 and 12, or stages 12 and 13, in embodiment 10.

The shaft 31 can be formed of metal or plastic, as those skilled in the art will appreciate. While plastic materials are presently preferably employed for the trough section 14, endplate 16, and bulkheads 21, those skilled in the art will appreciate that such could be formed of cast metal or the like if desired such as might be useful in certain test installation to determine metal contamination or the like. In place of shaft 31, for example, the shaft can be formed of an extruded ribbon of plastic which can be cut to length for providing a shaft means tailored for a given assembly of apparatus components such as taught herein. Collars can be used to position the shaft relative to bearings 26, or the like.

Referring to FIG. 4, another embodiment 50 of a modular rotating biological contactor apparatus of the present invention is shown. Embodiment 50 employes a separately formed hemicylindrical trough section 51 or 52 for each stage such as the respective stages 53 and 54.

As in the case of embodiment 10, the endplate employed in the embodiment 50 is similarly configured to the endplate 16. Similar components are numbered but with the addition of prime mark thereto for purposes of distinction.

However, in embodiment 50, each bulkhead 56 which is positioned between successive stages such as stages 53 and 54 is of molded integral construction and is provided with a pair of opposed raised flange portions, one pair being identified by the number 57 and the other pair by the number 58 with the flanges being hemispherically configured so as to provide receiving grooves 59 and 60, respectively, therebetween, the receiving grooves 59 and 60 being similar to the groove 19' in endplate 16' thereby adapting such grooves to receive and engage an end region of each hemicylindrical trough section 51 or 52, as the case may be. Thus, the embodiment 50 can be assembled by the disengagable interfit achieved between the interconnecting regions of the hemicylindrical trough sections 51 or 52 with the receiving grooves such as groove 19', 59 or 60, as those skilled in the art will appreciate.

Analogously to embodiment 10, the endplate 16' is provided with an integrally formed bearing member 26' and each bulkhead 56 is provided with an open bottom segment 61 for fluid throughput and an open slot 62 whereby the type of rotating contactor shaft arrangement utilized as described above in relation to embodiment 10 can be employed in the embodiment 50.

Embodiment 50 can employ any convenient contactor and shaft arrangement, as in embodiment 10.

As is apparent from the foregoing specification, the invention is susceptible of being embodied with various alterations and modifications which may differ partially from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. A coacting combination of components which are assemblable in a plurality of ways to provide a tankage assembly for a rotating biological contactor apparatus, said tankage assembly being characterized by having at least two generally coaxial chambers in longitudinally adjacent relationship to one another, each said chamber having generally hemicylindrical side walls with generally similar diametrical and circumferential dimensions, and further having generally flat end walls which are generally in spaced, parallel relationship to one another, said tankage assembly being comprised of:

(A) at least two hemicylindrical trough sections, all said trough sections having inside walls with generally similar diametrical and circumferential dimensions, and all being oriented relative to one another so as generally to have a common longitudinal axis, and each said trough section being generally in a proximate relationship relative to longitudinally adjacent others thereof, (B) a bulkhead means located adjacently between each adjacent pair of said trough sections, said bulkhead means including mounting means for engaging said bulkhead means with said adjacent pair of said trough sections in a generally fluid tight engagement and further including aperture means defined in each said bulkhead means for achieving fluid passage therethrough, (C) a pair of endplate means each one disposed adjacently across a different opposed end of the terminal pair of said trough sections, each said endplate means including mounting means for engaging said endplate means with a different one of said opposed ends in a generally fluid tight engagement and further including aperture means defined therein for achieving fluid passage therethrough, (D) support means integrally associated with at least one of said hemicylindrical trough sections, said bulkhead means, and said endplate means for independently supporting said tankage assembly relative to an underlying ground surface in an orientation such that said axis is generally horizontal, and (E) said trough sections, said bulkhead means, and said endplate means each including integrally formed, disengagably associatable interfitting means for directly connecting together respective adjacent portions of said trough sections, said bulkhead means, and said endplate means.

2. The tankage assembly of claim 1 further including rotating biological contactor means in functional association therewith.

3. The tankage assembly of claim 1 wherein the opposite ends of each said trough section is nestably receivable in a mating slot formed in each adjacent one of said bulkhead means and said endplate means.

4. The tankage assembly of claim 1 wherein each of said bulkhead means, said endplate means, and said trough sections is comprised of a preformed plastic material.

5. The tankage assembly of claim 3 wherein said slot is formed and defined by integrally formed flange means projecting outwardly from each said bulkhead means and said endplate means.

* * * * *